(12) United States Patent
Hayashi et al.

(10) Patent No.: US 6,680,676 B1
(45) Date of Patent: Jan. 20, 2004

(54) SWITCH UNIT AND PORTABLE TERMINAL DEVICE USING THE SWITCH UNIT

(75) Inventors: Takahiro Hayashi, Kanagawa (JP);
Akira Hasegawa, Tokyo (JP);
Hiroyuki Sato, Tokyo (JP); Shinji Tomobe, Kanagawa (JP); Hiroshi Ohmura, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/491,671

(22) Filed: Jan. 27, 2000

(30) Foreign Application Priority Data

Jan. 28, 1999 (JP) ............................................. 11-020481

(51) Int. Cl.[7] ............................................. H03K 17/967
(52) U.S. Cl. ............................. 341/22; 200/5 R; 200/6 R; 200/244
(58) Field of Search .................. 361/22, 13; 200/5 R, 200/6 R, 7 R, 8 R, 9, 238, 264, 292

(56) References Cited

U.S. PATENT DOCUMENTS

| | | | | |
|---|---|---|---|---|
| 3,691,324 A | * | 9/1972 | Brantingson | 200/5 E |
| 3,917,917 A | * | 11/1975 | Murata | 200/517 |
| 3,996,430 A | * | 12/1976 | Eberwein et al. | 200/5 A |
| 4,029,915 A | * | 6/1977 | Ojima | 708/145 |
| 4,575,601 A | * | 3/1986 | Taguchi et al. | 219/685 |
| 4,642,627 A | * | 2/1987 | Hodsdon | 341/13 |
| 4,947,461 A | | 8/1990 | Yoshioka et al. | |
| 5,083,240 A | * | 1/1992 | Pasco | 362/24 |
| 5,436,413 A | * | 7/1995 | Katakami | 200/11 DA |
| 5,546,457 A | | 8/1996 | Tomura et al. | |
| 5,821,480 A | | 10/1998 | Machida | |
| 5,841,849 A | | 11/1998 | Macor | |
| 5,901,223 A | * | 5/1999 | Wicks et al. | 379/433.02 |
| 6,215,420 B1 | * | 4/2001 | Harrison et al. | 200/302.1 |
| 6,217,183 B1 | * | 4/2001 | Shipman | 200/314 |
| 6,377,821 B2 | * | 4/2002 | Forlenzo et al. | 455/462 |

FOREIGN PATENT DOCUMENTS

| | | |
|---|---|---|
| EP | 0 508 563 A1 | 10/1992 |
| EP | 0 837 419 A2 | 4/1998 |
| EP | 0 872 996 A2 | 10/1998 |
| JP | A-6-139880 | 5/1994 |
| JP | A-8-96665 | 4/1996 |
| JP | 9261311 | 10/1997 |
| JP | A-9-261311 | 10/1997 |

* cited by examiner

*Primary Examiner*—Michael Horabik
*Assistant Examiner*—Hung Q Dang
(74) *Attorney, Agent, or Firm*—Pearne & Gordon LLP (57) ABSTRACT

Printed boards 31 and 38 are disposed in two layers inside a casing 1, and a selector cursor key and fixer keypad 21 is provided on the cover 2. Selector cursor key switches 34 are provided on the first printed board 31 on the keypad 21 side while a fixer key switch 39 is provided on the second printed board 38. A protrusion portion 21a of the keypad 21 is made to penetrate a through hole 33 of the first printed board 31 so as to face the fixer key switch 39. The selector cursor key switches 34 and the fixer key switch 39 are arranged adjacently to each other in planar view so as to be able to be pushed and operated through one selector cursor key and fixer keypad 21.

19 Claims, 7 Drawing Sheets

SWITCH UNIT AND PORTABLE TERMINAL DEVICE USING THE SWITCH UNIT

BACKGROUND OF THE INVENTION

1. Technical Field of the Invention

The present invention relates to a switch unit operated by pushing a keypad, and to a portable terminal device having such a switch unit.

2. Description of the Related Art

Figure 7:
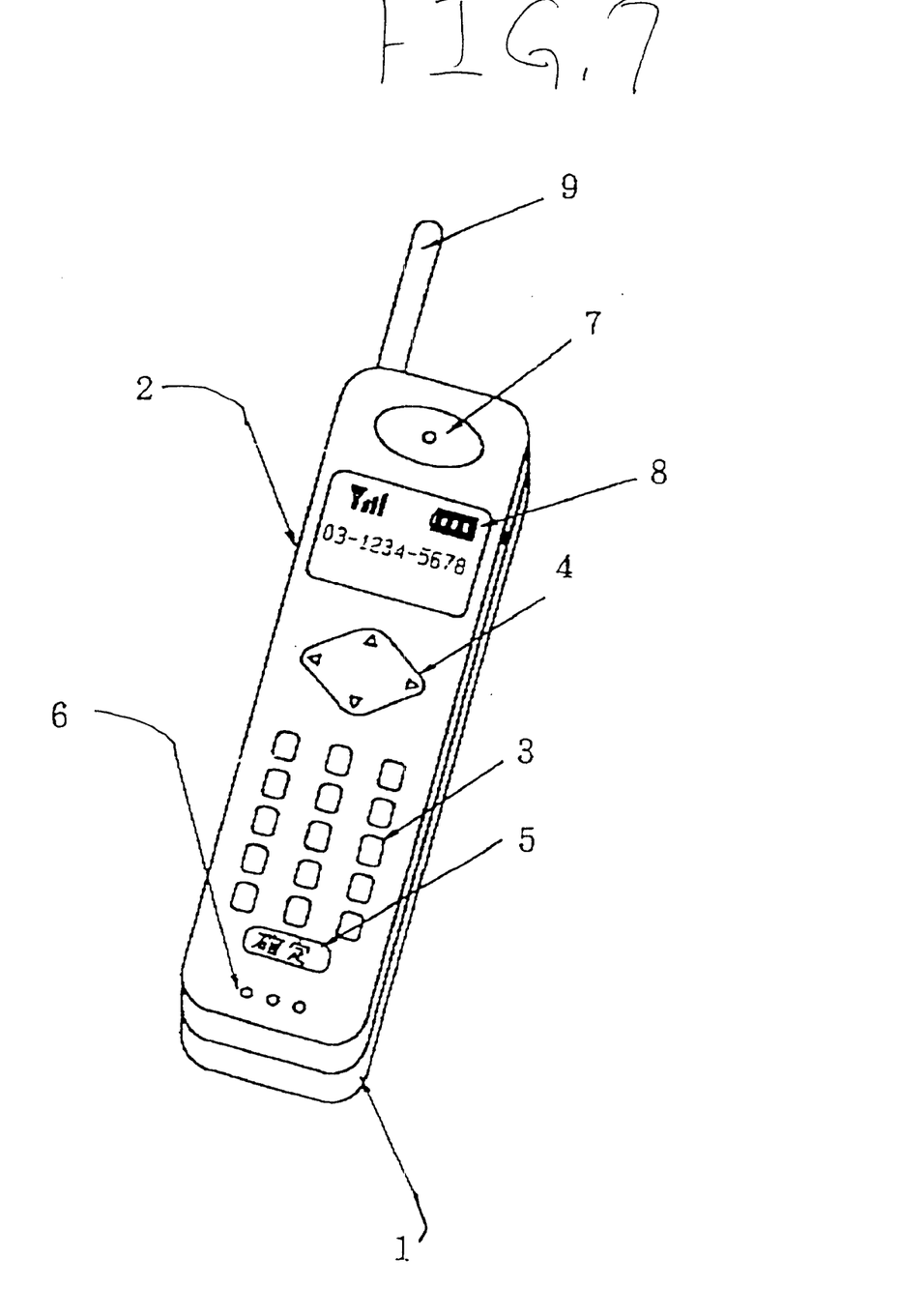
FIG. 7 is an external appearance view of a background-art portable telephone.

Conventionally, there is known a portable terminal device such as a portable telephone or the like, which has a switch unit provided with selector cursor key switches for selecting data displayed on a display portion, and a fixer key switch for fixing the selected data, those switches being operated by pushing keypads. JP-A-9-261311 discloses an example of a portable telephone which uses such selector cursor key switches and a fixer key switch instead of conventional ten-keys (number keys). There is also conventionally known a portable terminal device, such as a portable telephone, having selector cursor key switches and a fixer key in addition to ten-key switches. In such a portable telephone, a housing is generally constituted by a casing 1 and a cover 2 as shown in FIG. 7. In addition, the cover 2 is provided with ten-keypads 3 through which a numerical value such as a phone number or the like is inputted, a selector cursor keypad 4 having a scrolling function, a fixer keypad 5 having a fixer switch function, transmitter and receiver portions 6 and 7, a display portion 8 for displaying input characters or figures, and an antenna 9. To register a phone number in this portable telephone, the selector cursor keypad 4 is first used to confirm a phonebook registration area displayed on a menu section of the display portion 8, and then the fixer keypad 5 is pushed. Thus, registration with a phonebook is permitted. The ten-keypads 3 are pushed in this state to thereby input a name and a phone number to be registered, and then the fixer keypad 5 is pushed to perform registration.

Figure 8:
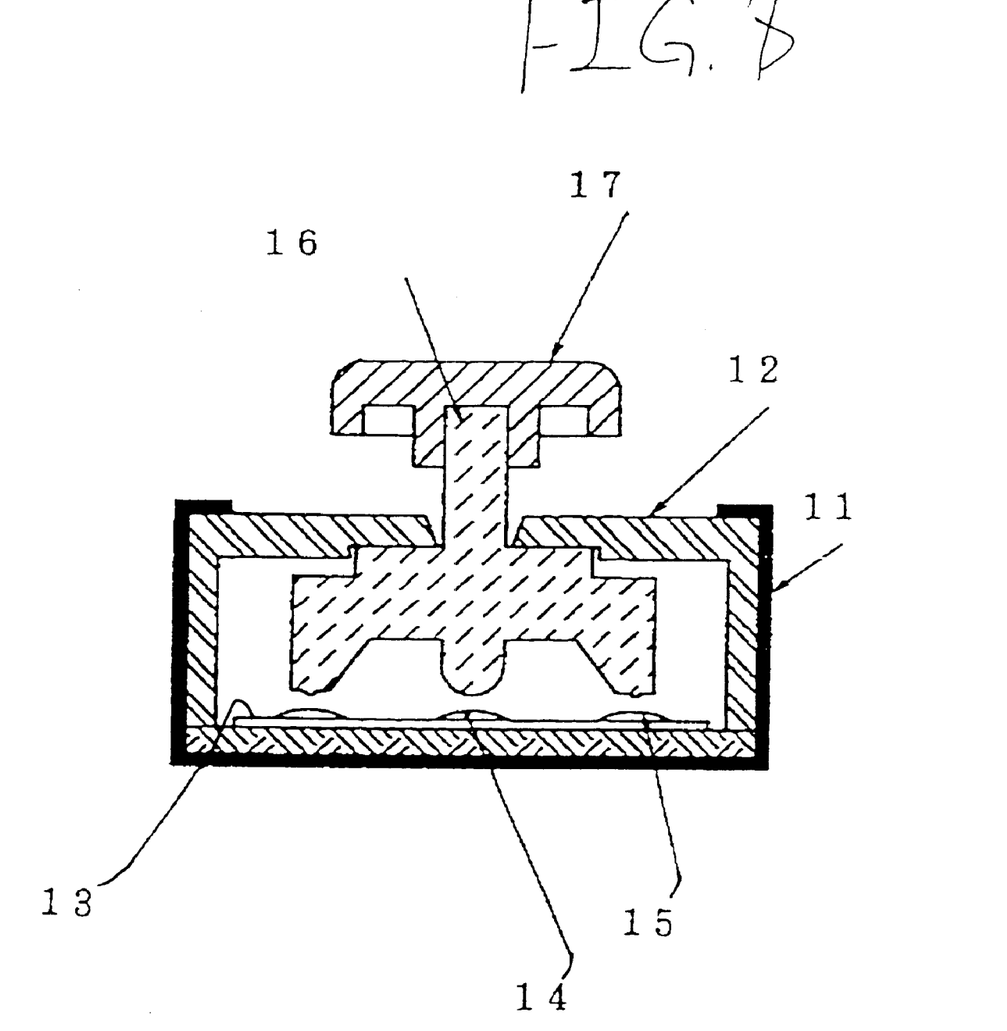
FIG. 8 is a sectional view of a background-art multi-input switch.

Alternatively, JP-A-8-96665 discloses another multi-input switch for generating a signal corresponding to the tilting direction of an operating shaft tilted by a tilting operation, and a signal corresponding to a push operation. In such a multi-input switch, generally, as shown in FIG. 8, a switch board 13 is disposed on the bottom surface of a switch casing 12 retained in a switch chassis 11, and a first switch 14 is disposed at the center of the top surface of the switch board 13 while a second switch 15 is disposed around the first switch 14. In addition, an operating shaft 16 constituted by a straight rod portion and a flange portion is disposed so that a protrusion portion on the lower surface of the flange portion faces the first and second switches 14 and 15 on the switch board 13, and the straight rod portion projects tiltably on the top surface of the switch casing 12. A switch cad 17 is attached to the top of the projecting straight rod portion.

In addition, JP-A-139880 discloses a multi-input switch in which the tilt of the operating lever brings a movable contact member or a metal operating lever into an electrical connection with a predetermined place of an annular resistor, and makes electrical conduction between the resistor and a fixed electrode, so that an electric signal corresponding to the tilting direction of the operating lever can be extracted. Thus, the multi-input switch can be made small and thin.

In the background-art portable terminal device such as a portable telephone or the like having selector cursor key switches and a fixer key switch and described with reference to FIG. 7, the selector cursor keypad 4 and the fixer keypad 5 are disposed separately, so that the area occupied by the key input portion becomes large as a whole, and it will be an obstacle to prospective miniaturization of the portable terminal device. Thus, it is considered that the multi-input switch disclosed in JP-A-8-96665 described with reference to FIG. 8 is applied to the case where selector cursor key switches and a fixer key switch are disposed adjacently to each other, and the selector cursor key switches and the fixer key switch are integrated. However, in the background-art multi-input switch, as described above, the switch board 13 is disposed on the bottom surface of the switch casing 12 retained in the switch chassis 11, and the first switch 14 is disposed at the center of the top surface of the switch board 13 while the second switch 15 is disposed around the first switch 14. In addition, the operating shaft 16 constituted by the straight rod portion and the flange portion is disposed so that the protrusion portion on the lower surface of the flange portion faces the first and second switches 14 and 15 on the switch board 13, and the straight rod portion projects tiltably on the top surface of the switch casing 12. The switch pad 17 is attached to the top of the projecting straight rod portion. Accordingly, the switch unit is large as a whole, and the structure thereof is complicated, so that the cost increases. As disclosed in JP-A-6-139880, there is another multi-input switch which is designed to extract an electric signal in accordance with the tilting direction of an operating lever without using a push switch, so that the multi-input switch can be made small and thin. However, also in this case, the multi-input switch has a basic structure similar to that shown in FIG. 8. That is, the switch unit is large as a whole, and the structure is complicated, so that the cost increases.

SUMMARY OF THE INVENTION

It is an object of the present invention to provide a switch unit operated by pushing a keypad, the switch unit being reduced in size and simplified in structure in order to reduce the cost, while two kinds of switches can be disposed adjacently to each other. It is another object of the present invention to provide a portable terminal device in which the above-mentioned switch unit is used so that the portable terminal device can be reduced in space for a key input portion, and in size and cost as s whole, and is superior in operation performance.

According to the present invention, there is provided a switch unit in which two layers of printed boards are provided with switches respectively so that the switches can be operated by pushing keypads provided on the housing. In addition, according to the present invention, such a switch unit is used in the portable terminal device.

According to this switch unit, two kinds of switches can be allocated to two layers of printed boards so as to be disposed adjacently to each other in planar view. Accordingly, keypads for the switches can be disposed at a place, and also can be made into one keypad miniaturized by integral forming, so that the switch unit can be miniaturized. In addition, the switches are disposed at high and low levels separately. The degree of freedom on mechanism is therefore increased so that the structure can be simplified, and the cost can be restrained. In addition, when this switch unit is used in the portable terminal device, for example, selector cursor key switches and a fixer key switch can be disposed adjacently to each other in planar view so that their keypads can be integrated. As a result, the space for a key input portion can be reduced, so that it is possible to obtain a portable terminal device which is small in size, low in cost and superior in operation performance.

According to a first aspect of the present invention, there is provided a switch unit comprising two layers of printed boards disposed inside a housing, the printed boards being provided with switches respectively so that the switches can be operated by pushing keypads provided on the housing. Thus, the two kinds of switches can be disposed adjacently to each other in planar view. Accordingly, the switch unit can be miniaturized, and the structure can be also simplified, so that the cost can be restrained.

According to a second aspect of the present invention, there is provided a switch unit comprising two layers of printed boards disposed inside a housing, the printed boards being provided with switches respectively so that the switches can be operated by pushing a single keypad provided on the housing. Thus, the two kinds of switches can be disposed adjacently to each other in planar view, so that their keypads can be miniaturized by integral forming. Accordingly, the switch unit can be miniaturized, and the structure can be also simplified, so that the cost can be restrained.

According to a third aspect of the present invention, the keypad is formed from an elastic material in the switch unit, so that the switches can be p,shed and operated by the elastic deformation of the elastic material.

According to a fourth aspect of the present invention, the elastic material is an elastomer material in the switch unit of the third aspect. Accordingly, the switches can be pushed and operated by the elastic deformation of the elastomer material.

According to a fifth aspect of the present invention, in the switch unit, an input key of the switch provided on one of the two layers of printed boards is disposed at a center of the keypad while an input key of the switch provided on the other printed board is disposed around the input key disposed at the center. Accordingly, it is possible to improve the miniaturization and operation performance of the keypad.

According to a sixth aspect of the present invention, in the switch unit, the one printed board is disposed on the keypad side while the other printed board is disposed on the opposite side to the keypad, and wherein the keypad has a protrusion portion disposed to penetrate a hole provided in the one printed board so as to face the switch provided on the one printed board, so that the switch provided on the one printed board is operated through the protrusion portion when the keypad is pushed. Accordingly, the switches provided on the two layers of printed boards can be operated through one keypad, and the switches are located at high and low levels separately. The degree of freedom on structure is therefore increased so that the structure can be simplified.

According to a seventh aspect of the present invention, the switch provided on the above-mentioned one printed board, that is, on the printed board on the keypad side is a contact switch in the switch unit. The switch can be therefore operated by pushing the keypad.

According to an eighth aspect of the present invention, in the switch unit, the keypad is formed from an elastomer material transmitting light, and wherein back light lamps different in colors are disposed on the two layers of printed boards respectively. Accordingly, by lighting these back light lamps individually, the selector cursor key portion and the fixer key portion can be indicated distinctively, for example, in the condition that it is dark in the surroundings.

According to a ninth aspect of the present invention, in the switch unit, the switch provided on one of the two layers of printed boards is a multi-input switch having n contact circuits. Accordingly, the switch can be formed as a multi-input switch having switch circuits numbering in n which is an optional number.

According to a tenth aspect of the present invention, there is provided a portable terminal device using a switch unit comprising two layers of printed boards disposed inside a housing, the printed board being provided with switches respectively so that the switches can be operated by pushing keypads provided on the housing. It is therefore possible to obtain a portable terminal device which is small in size, low in cost and superior in operation performance, using a switch unit in which two kinds of switches can be disposed adjacently to each other in planar view so that the switch unit can be miniaturized, and the structure can be also simplified so that the cost can be restrained.

According to an eleventh aspect of the present invention, there is provided a portable terminal device using a switch unit comprising two layers of printed boards disposed inside a housing, the printed board being provided with switches respectively so that the switches can be operated by pushing a single keypad provided on the housing. It is therefore possible to obtain portable terminal device which is small in size, low in cost and superior in operation performance, using a switch unit in which two kinds of switches can be disposed adjacently to each other in planar view, and their keypads can be miniaturized by integral forming, so that the switch unit can be miniaturized, the structure can be also simplified, and the cost can be restrained.

According to a twelfth aspect of the present invention, there is provided a portable terminal the comprising: a display portion for displaying data including characters; an input portion for selecting and fixing the data displayed on the display portion; a control portion for displaying the data selected and fixed by the input portion on the display portion; and a memory portion for storing the data; the input portion including a switch unit constituted by a selector cursor key switch for selecting data displayed on the display portion, a fixer key switch for fixing the selected data, and keypads for operating the selector cursor key switch and the fixer key switch respectively by depression of the key-pads; wherein the keypads for operating the selector cursor key switch and the fixer key switch respectively are formed into an integrated keypad. It is therefore possible to obtain the portable terminal device which is small in size, low in cost and superior in operation performance, using a switch unit in which the selector cursor key switches and the fixer key switch can be disposed adjacently to each other in planar view, and their keypads can be miniaturized by integral forming, so that the switch unit can be miniaturized, the structure can be also simplified, and the cost can be restrained.

According to a thirteenth aspect of the present invention, in the portable terminal device, the input portion includes ten-key switches and ten-keypads for operating the ten-key switches when being pushed. Accordingly, numerical values can be inputted through the ten-key switches.

According to a fourteenth aspect of the present invention, in the portable terminal device, the integrated keypad of the switch unit is formed from an elastic material. Accordingly, the respective switches can be pushed and operated by the elastic deformation of the elastic material.

According to a fifteenth aspect of the present invention, in the portable terminal device, the elastic material is an elastomer material. Accordingly, the respective switches can be pushed and operated by the elastic deformation of the elastomer material.

According to a sixteenth aspect of the present invention, in the portable terminal device, a fixer key is disposed at a center of the integrated keypad while selector cursor keys are disposed around the fixer key. It is therefore possible to improve the miniaturization and operation performance of the keypad.

According to a seventeenth aspect of the present invention, in the portable terminal device, the selector cursor key switch and fixer key switch of the switch unit are provided on a printed board disposed inside a portable terminal device housing, and wherein the integrated keypad for operating the selector cursor key switch and fixer key switch of the switch unit is provided on the portable terminal device housing. Since the switch housing is constituted by use of the portable terminal device housing, the cost is restrained from increasing.

According to an eighteenth aspect of the present invention, in the portable terminal device, the selector cursor key switch and fixer key switch of the switch unit are provided on two separately disposed layers of printed boards respectively. It is therefore possible to obtain portable terminal device which is small in size, low in cost and superior in operation performance, using a switch unit in which the selector cursor key switches and the fixer key switch can be disposed adjacently to each other in planar view, and their keypads can be miniaturized by integral forming, so that the switch unit can be miniaturized, the structure can be also simplified, and the cost can be restrained.

According to a ninteenth aspect of the present invention, in the portable terminal device, the switch unit is configured so that a first one of the printed boards provided with the selector cursor key switch is disposed on the integrated keypad side while a second one of the printed boards provided with the fixer key switch is disposed on the opposite side to the integrated keypad of the first printed board, and wherein the integrated keypad has a protrusion portion which is made to penetrate a hole provided in the first printed board so as to face the fixer key switch so that the fixer key switch is operated through the protrusion portion when the integrated keypad is pushed. The selector cursor key switch and the fixer key switch provided on two layers of printed boards can be operated through one keypad respectively, and the switches are located at high and low levels separately. The degree of freedom on structure is therefore increased so that the structure can be simplified. As a result, it is possible to make the portable terminal device small in size, low in cost and improved in operation performance.

According to a twentieth aspect of the present invention, in the portable terminal device, the selector cursor key switch is a contact switch. Accordingly, the switch can be operated by pushing the keypad.

According to a twenty-first aspect of the present invention, in the portable terminal device, the integrated keypad is formed from an elastomer material transmitting light, and wherein back light lamps in different colors are disposed on the first and second printed boards respectively. Accordingly, by lighting these back light lamps individually, the selector cursor key portion and the fixer key portion can be indicated distinctively, for example, in the condition that it is dark in the surroundings.

According to a twenty-second aspect of the invention, in the portable terminal device, the selector cursor key switch is a multi-input switch having n contact circuits. Accordingly, the switch can be formed as a multi-input switch having switch circuits numbering in n which is an optional number.

DETAILED DESCRIPTION OF THE PRESENT INVENTION

The present invention will be described in detail with reference to FIGS. 1 to 6.

First Embodiment

Figure 1:
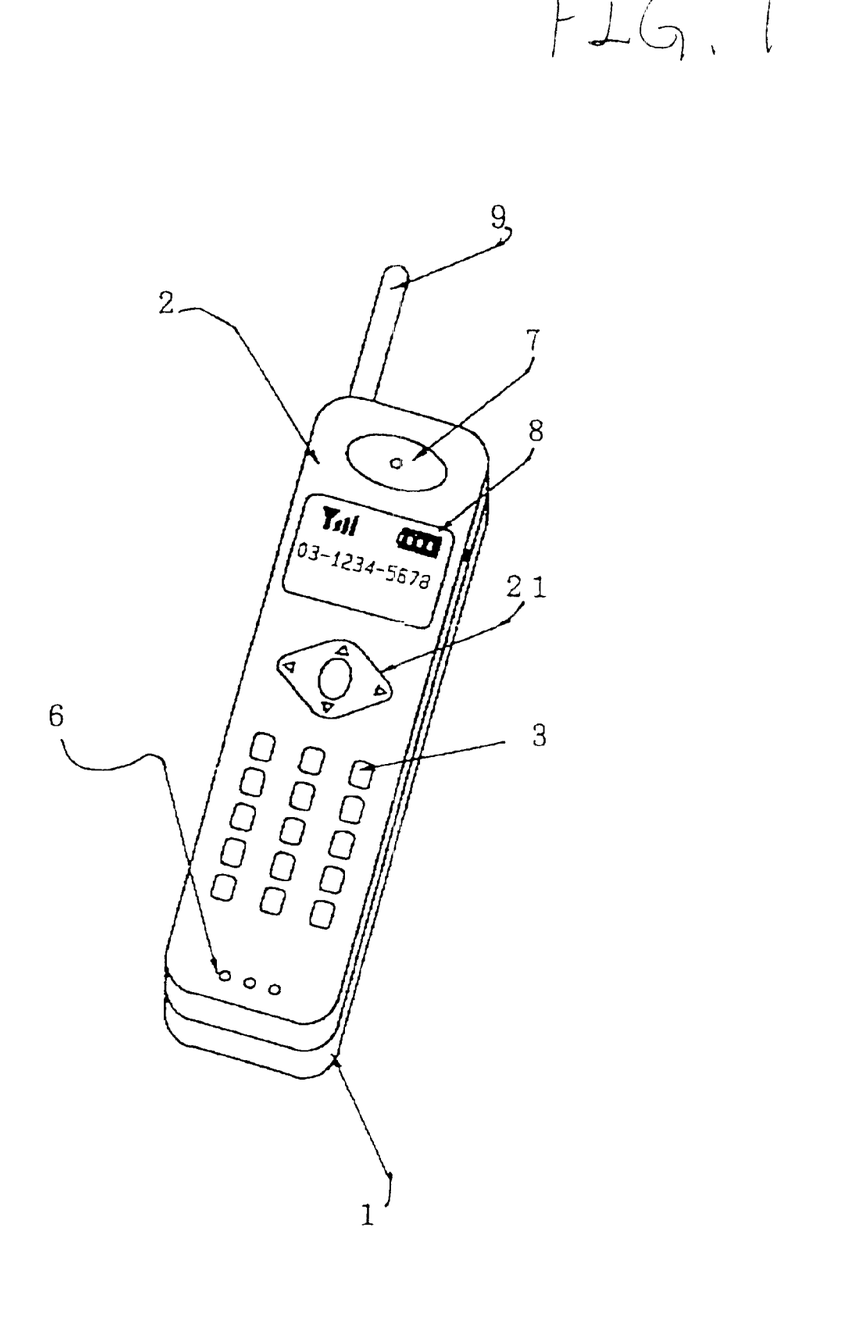
FIG. 1 is an external appearance view of a portable telephone according to a first embodiment of the present invention.
Figure 2:
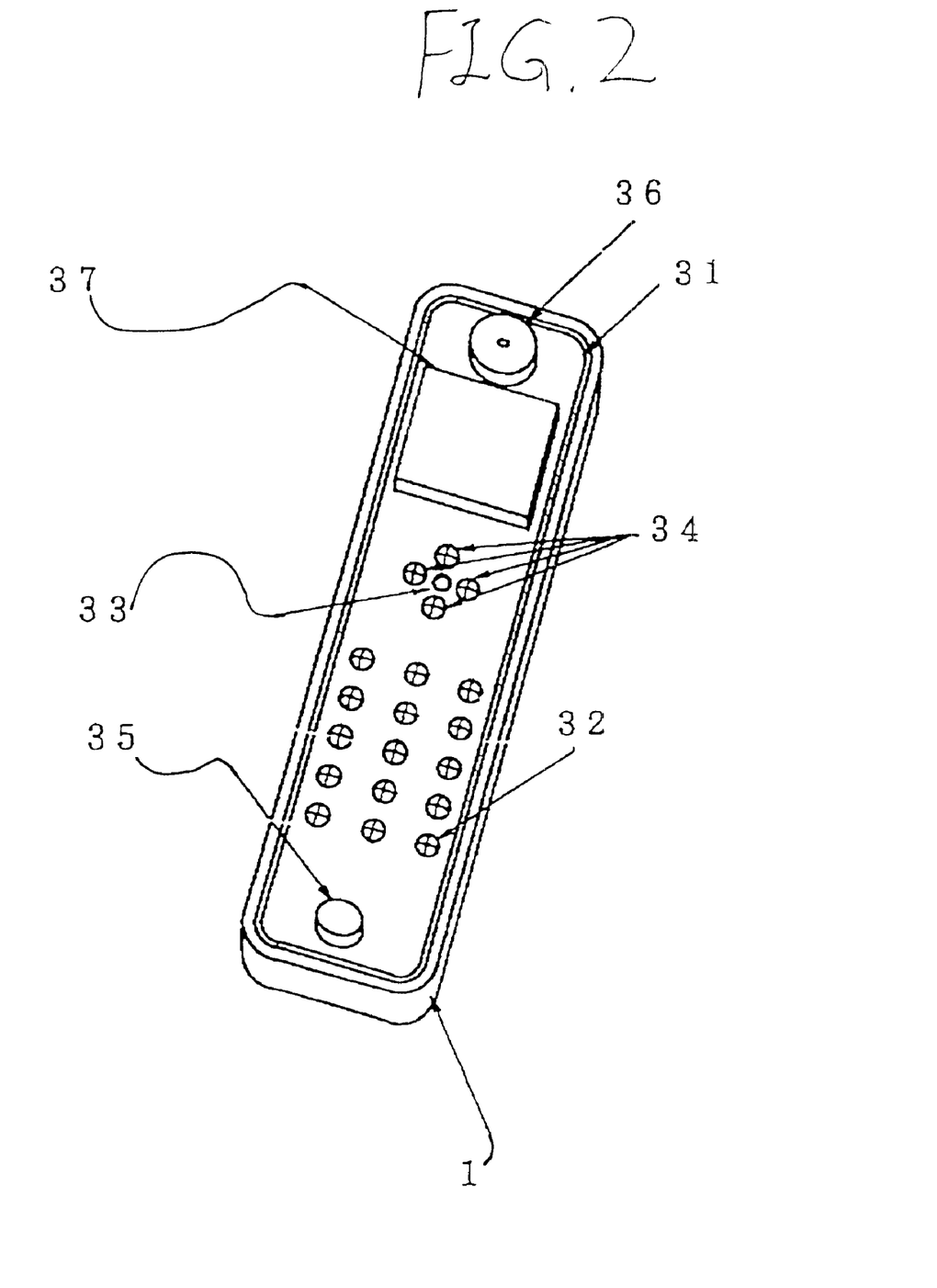
FIG. 2 is an external appearance view of the portable telephone shown in FIG. 1, showing a state where a cover and keypads have been removed.
Figure 3:
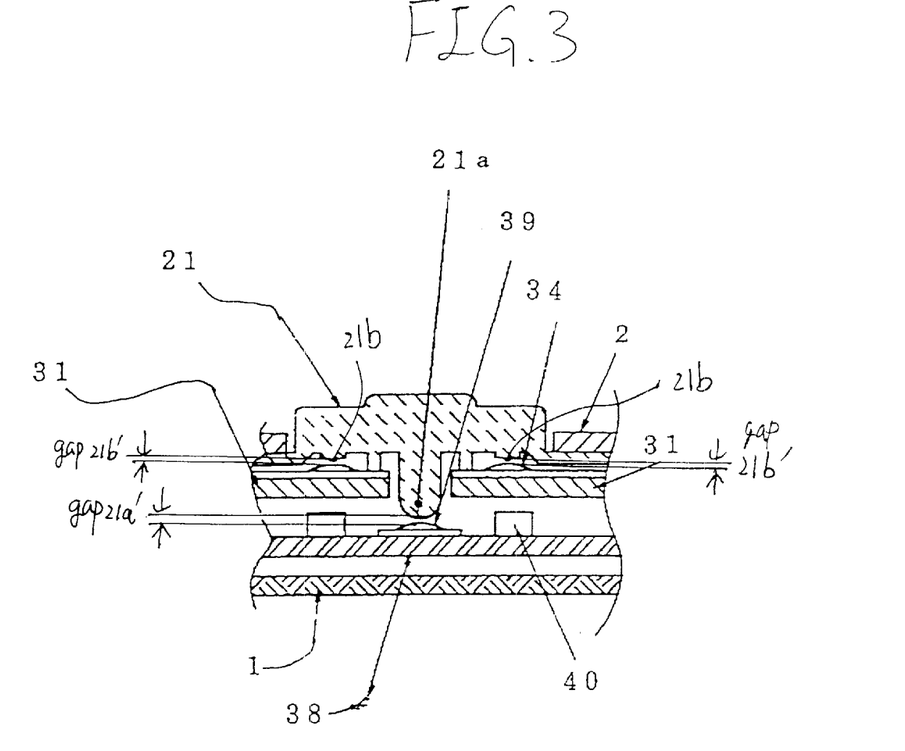
FIG. 3 is a sectional view near a selector cursor key and fixer keypad of the portable telephone shown in FIG. 1.

FIGS. 1 to 3 involve a first embodiment of the present invention. FIG. 1 shows an external appearance of a portable telephone as portable terminal device; FIG. 2 shows the external appearance of the portable telephone shown In FIG. 1, in which a cover and keypads have been removed; and FIG. 3 shows a sectional structure near a selector cursor key and fixer keypad of the portable telephone shown in FIG. 1.

In this portable telephone, a housing as a portable terminal device housing is constituted by a casing 1 and a cover 2 as shown in FIG. 1. The cover 2 is provided with ten-keypads 3 as an input portion for inputting a numerical value such as a telephone number or the like, and a selector cursor key and fixer keypad 21 formed integrally and having a scroll function and a fixer switch function. The selector cursor key and fixer keypad 21 is formed from elastic material such as elastomer material or the like. As shown in FIG. 1, in the selector cursor key and fixer keypad 21, an elliptic fixer key is located at the center while triangle-marked selector cursor keys are disposed around the elliptic fixer key. In addition, the cover 2 is provided with a transmitter portion 6, a receiver portion 7, a display portion 8 for display input characters or figures, and an antenna 9.

Inside the casing 1, there are provided a control circuit as a control portion for processing data such as input figures or characters and making the display portion 8 display the processed data, and a memory circuit as a memory portion for storing the processed data (each circuit is not shown). In addition, in the casing 1, there is disposed a first printed board 31 on the upper surface thereof, that is, on the surface to be covered with the cover 2. On the printed board 31, there are provided: ten-key switches 32 in portions which will be put on the inner sides of the above-mentioned ten-keypads 3 when the cover 2 is attached; a through hole 33 in the center of a portion which will be put on the inner side of the selector cursor key and fixer keypad 21; four selector cursor key switches 34 around the through hole 33 respectively; a microphone 35 at a portion which will be put on the inner side of the transmitter portion 6; a speaker 36 in a portion which will be put on the inner side of the receiver 7; and a liquid-crystal display 37 at a portion which will be put on the inner side of the display portion 8.

As shown in FIG. 3, inside the casing 1, a second printed board 38 is disposed on the opposite side (lower side in FIG. 3) to the selector cursor key and fixer keypad 21 through the first printed board 31, separately from the first printed board 31. On this second printed board 38, a fixer key switch 39 is provided just under the through hole 33 provided in the first printed board 31. A protrusion portion 21a provided at the center of the lower surface of the selector cursor key and fixer keypad 21 of the first printed board 31 penetrates the through hole 33 of the first printed board 31, and normally faces the fixer key switch 39 through a distance. In addition, built-in electric parts 40 are disposed on the second printed board 38 as shown in FIG. 3.

In this embodiment, each of the selector cursor key switches provided on the first printed board 31 and the fixer key switch 39 provided on the second printed board is constituted by a diaphragm-type push switch as a contact switch.

In order to operate the fixer key switch 39, a center portion of the fixer keypad 21 is pushed in vertical to the second printed board so that the fixer key switch 39 operates by a convex portion 21*a*. A gap 21*a*' between the convex portion 21*a* and the fixer key switch 39 is narrower than a gap 21*b*' between each convex portion 21*b* and each of the selector cursor key switches 34. Therefore, when the fixer key switch 39 operates by pushing the center portion of the fixer keypad 21 in vertical to the second printed board, each of the selector cursor key switches 34 does not operate before the fixer key switch 39 operates. On the other hand, in order to operate the one of the selector cursor switches 34, one of the selector cursor keypads 21 is pushed at slant with respect to the second printed board so that the one of the selector cursor key switches 34 operates by the convex portion 21*b* of the one of the cursor keypads 21.

To perform phonebook registration in this portable telephone, first, a selector key provided in the selector cursor key and fixer keypad 21 is pushed. After a phonebook registration area displayed on a menu section of the display portion 8 is confirmed, a fixer key provided in the selector cursor key and fixer keypad 21 is pushed. Thus, phonebook registration is permitted. In this state, the ten-keypads 3 are pushed to input a name and a phone number to be registered, and the fixer key is pushed again. Thus, the registration is completed.

In this portable telephone, the selector cursor key switches 34 and the fixer key switch 39 are disposed adjacently to each other in planar view, when they are viewed from above in FIG. 3. Accordingly, the integrally formed selector cursor key and fixer keypad 21 for operating the selector cursor key switches 34 and the fixer key switch 39 is substantially as large in planar view as the selector cursor keypad 4 of the background-art portable telephone shown in FIG. 7. Thus, the switch unit constituted by the selector cursor key switches 34 on the first printed board 31, the fixer key switch 39 on the second printed board 38, and the selector cursor key and fixer keypad 21 is formed to be compact, and the structure of the switch unit is comparatively simple. In addition, the casing 1 and the cover 2 constituting the portable terminal device housing are designed to have another function as a switch housing, so that the cost can be restrained from increasing. In addition, since the selector cursor key switches 34 and the fixer key switch 39 can be pushed and operated through one selector cursor key and fixer keypad 21, the operation performance is superior.

Second Embodiment

Figure 4:
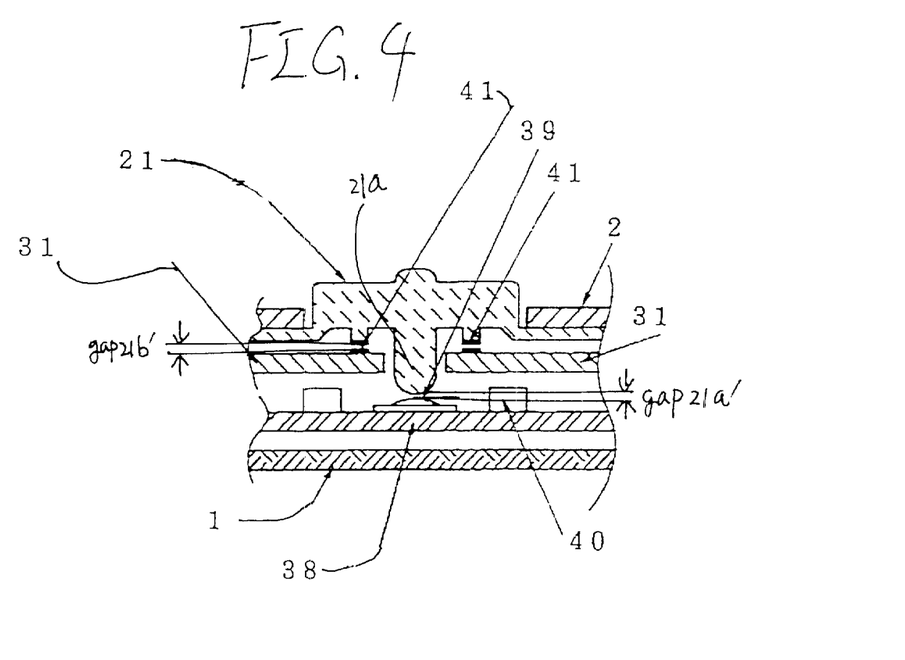
FIG. 4 is a sectional view near a selector cursor key and fixer keypad of a portable telephone according to a second embodiment of the present invention.

FIG. 4 shows a sectional structure near a selector cursor key and fixer keypad of a portable telephone as portable terminal device according to a second embodiment of the present invention. The portable telephone shown in this embodiment has a basic structure which is similar to that in the first embodiment described previously. The external appearance of the portable telephone is just as shown in FIG. 1, and the external appearance in the state where a cover and keypads have been removed is just as shown in FIG. 2. The portable telephone has a casing 1, a cover 2, ten-keypads 3, a selector cursor key and fixer keypad 21, a transmitter portion 6, a receiver portion 7, a display portion 8, an antenna 9, a control circuit and a memory circuit in the same manner as in the first embodiment. In addition, a first printed board 31 is provided on the upper surface of the casing 1. Ten-key switches 32, a through hole 33, selector cursor key switches 34, a microphone 35, a speaker 36 and a liquid crystal display 37 are provided on the printed board 31 in the same way as in the first embodiment. In addition, a second printed board 38 and a fixer key switch 39 inside the casing 1 are provided also in the same manner, so that a protrusion portion 21*a* provided at the center of the lower surface of the selector cursor key and fixer keypad 21 of the first printed board 31 penetrates the through hole 33 of the first printed board 31, and normally faces the fixer key switch 39 through a distance. In addition, built-in electric parts 40 are disposed on the second printed board 38. In the case of the portable telephone shown in this embodiment, there are used selector cursor key switches 41 each constituted by a conductive rubber switch operated by bringing a conductive rubber material into electrical contact with a not-shown pattern provided on the first printed board 31. The fixer key switch 39 provided on the second printed board 38 is a diaphragm-type push switch. The operation of the switch unit and the operation of phonebook registration in the portable telephone using the switch unit are similar to those in the first embodiment described previously.

The operation of the fixer key switch 39 and the operation of each of the selector cursor key switches 41 are the same manner as the operations in the first embodiment. In order to operate the fixer key switch 39, the center portion of the fixer keypad 21 is pushed in vertical to the second printed board so that the convex portion 21*a* operates the fixer key switch 39. The gap between the convex portion 21*a* and the fixer key switch 39 is narrower than a gap 41*a* of the conductive rubber switch of one of the selector cursor key switches 41. Therefore, when the center portion of the fixer keypad 21 is pushed in vertical to the second printed board to operate the fixer key switch 39, each of the selector cursor key switches 41 is not operated before the fixer key switch 39 operates. On the other hand, in order to operate one of the selector cursor key switches 41, the selector cursor keypad is pushed at slant with respect to the second printed board to eliminate the gap 41*a* of the conductive rubber switch of the one of the selector cursor key switches 41, thereby operating the selector cursor key switch 41.

In addition, in the same manner as in the first embodiment, the switch unit can be formed to be compact, simplified in structure, restrained from increasing the cost, and improved in operation performance.

Third Embodiment

Figure 5:
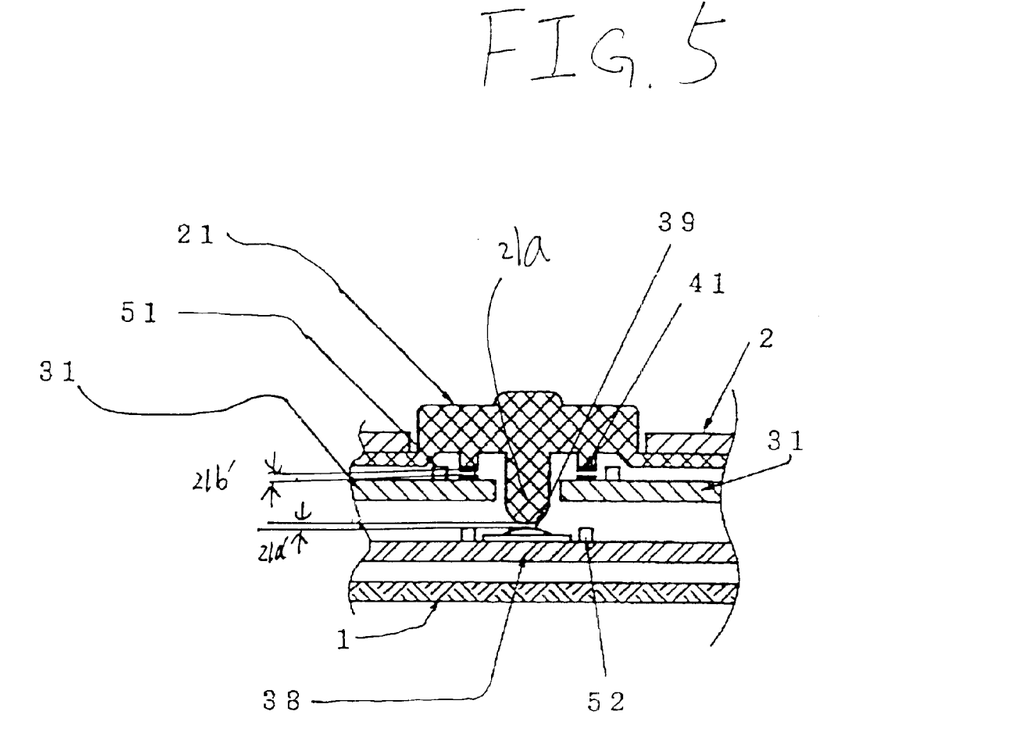
FIG. 5 is a sectional view near a selector cursor key and fixer keypad of a portable telephone according to a third embodiment of the present invention.

FIG. 5 shows a sectional structure near a selector cursor key and fixer keypad of a portable telephone as portable terminal device according to a third embodiment of the present invention. The portable telephone shown in this embodiment has a basic structure which is similar to that in the second embodiment described previously. The external appearance of the portable telephone is just as shown in FIG. 1, and the external appearance in the state where a cover and keypads have been removed is just as shown in FIG. 2. The portable telephone is similar to that in the second embodiment, also with respect to a casing 1, a cover 2, ten-keypads 3, a selector cursor key and fixer keypad 21, a transmitter portion 6, a receiver portion 7, a display portion 8, an antenna 9, a control circuit, a memory circuit, a first printed board 31, ten-key switches 32, a through hole 33, selector cursor key switches 41, a microphone 35, a speaker 36, a liquid crystal display 37, a second printed board 38, a fixer key switch 39 and built-in electric parts 40. Selector cursor key switches 41 each constituted by a conductive rubber switch operated by bringing a conductive rubber material into electrical contact with a not-shown pattern provided on the first printed board 31 are used also in this embodiment as shown in FIG. 5.

The operation of the fixer key switch 39 and the operation of each of the selector cursor key switches 41 are the same manner as the operations in the first embodiment. In order to operate the fixer key switch 39, the center portion of the fixer keypad 21 is pushed in vertical to the second printed board so that the convex portion 21*a* operates the fixer key switch 39. The gap between the convex portion 21*a* and the fixer key switch 39 is narrower than a gap 41*a* of the conductive rubber switch of one of the selector cursor key switches 41. Therefore, when the center portion of the fixer keypad 21 is pushed in vertical to the second printed board to operate the fixer key switch 39, each of the selector cursor key switches 41 is not operated before the fixer key switch 39 operates. On the other hand, in order to operate one of the selector cursor key switches 41, the selector cursor keypad is pushed at slant with respect to the second printed board to eliminate the gap 41*a* of the conductive rubber switch of the one of the selector cursor key switches 41, thereby operating the selector cursor key switch 41.

In the case of the portable telephone shown in this embodiment, not only is the selector cursor key and fixer keypad 21 formed from a light-transmissive material, for example, a silicon elastomer material, but also LED (light-emitting diode) lamps 51 and 52 in different colors are disposed as back light lamps in portions of the first and second printed boards 31 and 38 which are put on the selector cursor key and fixer keypad 21. The LED lamps 51 and 52 are lighted individually so that the selector cursor key portion and the fixer key portion can be indicated distinctively in the condition that it is dark in the surroundings. Also in this case, the operation of the switch unit and the operation of phonebook registration in the portable telephone using the switch unit are similar to those in the first embodiment described previously. In addition, in the same manner as in the first embodiment, the switch unit can be formed to be compact, simplified in structure, restrained from increasing the cost, and improved in operation performance.

Fourth Embodiment

Figure 6:
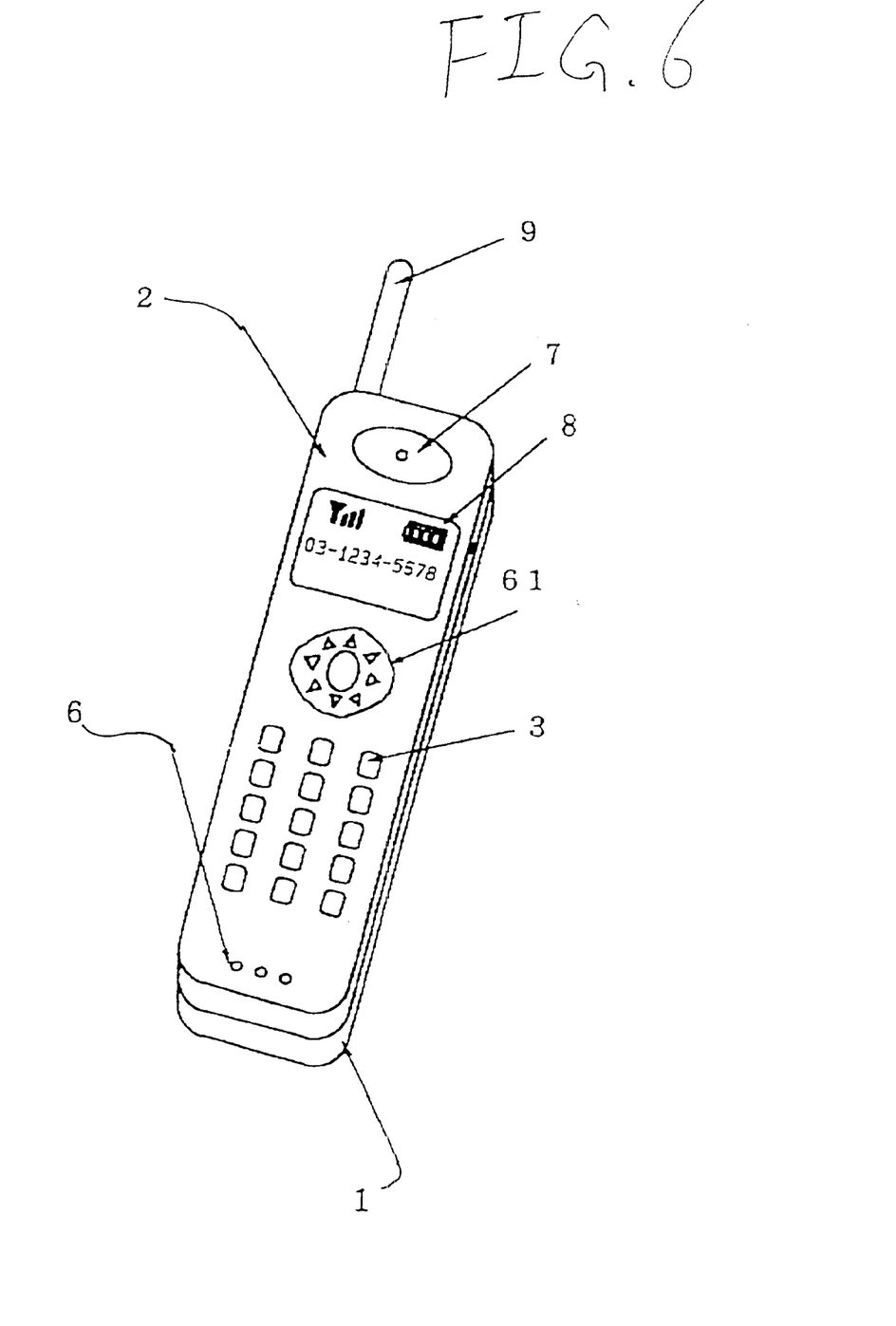
FIG. 6 is an external appearance view of a portable telephone according to a fourth embodiment of the present invention.

FIG. 6 shows an external appearance of a portable telephone as portable terminal device according to a fourth embodiment of the present invention. The portable telephone shown in this embodiment has a basic structure which is similar to that in the first, second or third embodiment described previously, and the portable telephone has a casing 1, a cover 2, ten-keypads 3, a transmitter portion 6, a receiver portion 7, a display portion 8 and an antenna 9. A control circuit and a memory circuit are provided inside the casing 1. In addition, this portable telephone is similar to that in the first, second or third embodiment, also with respect to a first printed board 31, ten-key switches 32, a through hole 33, a selector cursor key switch 34 (41), a microphone 35, a speaker 36, a liquid crystal display 37, a second printed board 38, a fixer key switch 39 and built-in electric parts 40. In the case of the portable telephone shown in this embodiment, the selector cursor switch 34 has eight switch circuits, and a selector cursor key and fixer keypad 61 provided with eight selector cursor keys is used as shown in FIG. 6. Also in this case, the operation of the switch unit and the operation of phonebook registration in the portable telephone using the switch unit are also similar to those in the first embodiment described previously. In addition, likewise, the switch unit can be formed to be compact, simplified in structure, restrained from increasing the cost, and improved in operation performance.

Although a diaphragm-type push switch or a conductive rubber switch is used as a selector cursor key switch in the above-mentioned first, second, third and fourth embodiments, other contact switches may be used as the selector cursor key switch, and it is a matter of course that various alternations can be made within a scope not-departing from the technical thought of the present invention.

In addition, the selector cursor key switch may have switch circuits numbering in n which is an optional number, and it is a matter of course that various alternations can be made within a scope not-departing from the technical thought of the present invention.

In addition, although the switch unit according to the present invention is applied to a portable telephone, the present invention is also applicable to portable terminal device other than the portable telephone.

As described above, according to the present invention, in the switch unit configured to be operated by pushing of keypads, two kinds of switches can be allocated to two layers of printed boards so as to be disposed adjacently to each other in planar view. Accordingly, keypads for the switches can be disposed at a place, and also can be made into one keypad miniaturized by integral forming, so that the switch unit can be miniaturized. In addition, the switches are disposed at high and low levels separately. The degree of freedom on mechanism is therefore increased so that the structure can be simplified, and the cost can be restrained. In addition, when this switch unit is used in portable terminal device, for example, selector cursor key switches and a fixer key switch can be disposed adjacently to each other in planar view so that their keypads can be intergrated. As a result, the space for a key input portion can be reduced, so that is possible to obtain portable terminal device which is small in size, low in cost and superior in operation performance.

What is claimed is:

1. A switch unit comprising:
   a housing having a front surface;
   a first printed board disposed below the front surface of the housing;
   a second printed board disposed below the first printed board;
   a first switch disposed on the first printed board;
   a second switch disposed on the second printed board; and
   a keypad disposed on the front surface of the housing;
   wherein each of the first switch and the second switch is operated when the keypad is pushed,
   wherein the keypad has a central key defined on the center of the keypad and a peripheral key defined around the central key,
   the central key operates one of the first switch and the second switch when the central key is pushed, and
   the peripheral key operates the other of the first switch and the second switch when the peripheral key is pushed.

2. The switch unit as claimed in claim 1, wherein the keypad is made of an elastic material.

3. The switch unit as claimed in claim 1, wherein the elastic material is an elastomer material.

4. The switch unit as claimed in claim 1, wherein one of the first switch and the second switch is a multi-input switch having a plurality of contact circuits.

5. The switch unit according to claim 1, wherein the first switch and the second switch are disposed lateral to each other.

6. A switch unit comprising:
   a housing having a front surface;
   a first printed board disposed below the front surface of the housing;
   a second printed board disposed below the first printed board, a first switch disposed on the first printed board;

a second switch disposed on the second printed board; and a keypad disposed on the front surface of the housing, wherein each of the first switch and the second switch is operated when the keypad is pushed, wherein the keypad has a central key defined on the center of the keypad peripheral key defined around the central key, the central key operates one of the first switch and the second switch when the central key is pushed; and the peripheral key operates the other of the first switch and the second switch when the peripheral key is pushed, wherein the first printed board defines a hole;

the keypad has a protrusion below the central key, the protrusion penetrating through the hole to face a top of the protrusion to the second switch on the second printed board; and the protrusion operates the second switch when the central key is pushed.

7. The switch unit as claimed in claim 6, wherein the first switch is a contact switch.

8. The switch unit as claimed in claim 7, wherein:

the keypad is made of an elastomer material transmitting light;

a back light lamp is disposed on each of the first printed board and the second printed board; and the back light lamp on the first printed board is different in color from that of the second printed board.

9. A portable terminal device comprising: a switch unit including:

a housing having a front surface;

a first printed board disposed below the front surface of the housing;

a second printed board disposed below the first printed board;

a first switch disposed on the first printed board;

a second switch disposed on the second printed board; and a keypad disposed on the front surface of the housing;

wherein each of the first switch and the second switch is operated when the keypad is pushed, wherein the keypad has a central key defined on the center of the keypad and a peripheral key defined around the central key, the central key operates one of the first switch and the second switch when the central key is pushed, and the peripheral key operates the other of the first switch and the second switch when the peripheral key is pushed.

10. The portable terminal device according to claim 8, wherein the first switch and the second switch are disposed lateral to each other.

11. A portable terminal device comprising:

a housing having a front surface;

a display portion for displaying data including characters;

an input portion for selecting and fixing the data displayed on the display portion;

a control portion for displaying the data selected and fixed by the input portion on the display portion; and a memory portion for storing the data;

wherein the input portion including a switch unit having:
    a selector cursor key switch for selecting data displayed on the display portion,
    a fixer key switch for fixing the selected data, and
    a keypad disposed on the housing for operating the selector cursor key switch and
    the fixer key switch respectively by pushing the keypad;
    a first printed board in the housing;
    a second printed board in the housing,
    wherein the selector cursor key switch and fixer key switch are provided on the firs t printed board and the second printed board respectively.

12. The portable terminal device according to claim 11, wherein the input portion includes a plurality of ten-key switches and a plurality of ten-keypads for being pushed to operate the ten-key switches.

13. The portable terminal device according to claim 11, wherein the keypad of the switch unit is made of an elastic material.

14. The portable terminal device according to claim 13 wherein the elastic material is an elastomer material.

15. The portable terminal device according to claim 11, wherein the keypad has a fixer key disposed at a center of the keypad and a selector cursor key disposed around the fixer key.

16. A portable terminal device according to claim 11, wherein:

the first printed board has the selector cursor key switch;

the first printed board is disposed below the front surface of the housing;

the second printed board has the fixer key switch;

the second printed board is disposed below the first printed board, the first printed board defines a hole, the keypad has a protrusion penetrating through the hole in the first printed board to face the fixer key switch on the second printed board; and the fixer key switch is operated through the protrusion when the keypad is pushed.

17. A portable terminal device according to claim 14, wherein the selector cursor key switch is a contact switch.

18. A portable terminal device according to claim 16, wherein:

the keypad is made of an elastomer material transmitting light; and each of the first printed board and the second printed board has a back light lamp different in color from each other.

19. A portable terminal device according to claim 11, wherein the selector cursor key switch is a multi-input switch having a plurality of contact circuits.

* * * * *